US012630402B2

(12) United States Patent
Lindsey

(10) Patent No.: US 12,630,402 B2
(45) Date of Patent: May 19, 2026

(54) PALLET PUSHING DEVICE FOR FORKLIFT

(71) Applicant: Dale Lindsey, Freeport, TX (US)

(72) Inventor: Dale Lindsey, Freeport, TX (US)

( * ) Notice: Subject to any disclaimer, the term of this patent is extended or adjusted under 35 U.S.C. 154(b) by 501 days.

(21) Appl. No.: 18/179,043

(22) Filed: Mar. 6, 2023

(65) Prior Publication Data

US 2023/0278840 A1 Sep. 7, 2023

Related U.S. Application Data

(60) Provisional application No. 63/317,119, filed on Mar. 7, 2022.

(51) Int. Cl.
*B66F 9/19* (2006.01)
*B66F 9/075* (2006.01)

(52) U.S. Cl.
CPC .......... *B66F 9/195* (2013.01); *B66F 9/07504* (2013.01)

(58) Field of Classification Search
CPC ............. B66F 9/19; B66F 9/195; E01H 5/061
See application file for complete search history.

(56) References Cited

U.S. PATENT DOCUMENTS

| | | | | |
|---|---|---|---|---|
| 3,791,544 A * | 2/1974 | Moses | B66F 9/19 414/785 |
| 4,890,973 A * | 1/1990 | Frison | B66F 9/195 414/661 |
| 5,692,583 A | 12/1997 | Reed et al. | |
| D1,022,378 S * | 4/2024 | Cho | D34/34 |
| 2004/0208734 A1 | 10/2004 | Shoemyer et al. | |
| 2004/0265108 A1 | 12/2004 | Richardson | |
| 2006/0182586 A1* | 8/2006 | Lauvdal | B66F 9/182 414/623 |
| 2012/0119530 A1* | 5/2012 | Lauvdal | B66F 9/195 294/188 |
| 2013/0195592 A1* | 8/2013 | Meijer | B66F 9/195 414/661 |

(Continued)

FOREIGN PATENT DOCUMENTS

| | | |
|---|---|---|
| CN | 202482004 U | 10/2012 |
| CN | 104627903 A | 5/2015 |

(Continued)

OTHER PUBLICATIONS

Vestil Maufacturing Corp, SBP-P Fork Snow Plow, Oct. 17, 2019 https://www.youtube.com/watch?v=fPhynD2yuBE (Year: 2015).*

(Continued)

*Primary Examiner* — Kaitlin S Joerger
(74) *Attorney, Agent, or Firm* — Jacob M. Ward; Ward Law Office LLC

(57) ABSTRACT

The present disclosure provides a pushing device to be mounted on a forklift for pushing an object onto a carrier. The pushing device can include a pair of push rails, a push bar, and a skid plate. Each of the push rails can an aperture for removably accepting a fork of the forklift. The push bar can be disposed on an opposite side of the pushing device of the aperture and can be for contacting and pushing the object. The skid plate can be disposed on a bottom side of the pushing device. The skid plate can provide an interface between the pushing device and the carrier as the object is pushed onto the carrier. A method for using a pushing device to be mounted on a forklift for pushing an object onto a carrier is also provided.

19 Claims, 4 Drawing Sheets

(56) References Cited

U.S. PATENT DOCUMENTS

| | | | | |
|---|---|---|---|---|
| 2023/0166907 | A1* | 6/2023 | Clevenger | B66F 9/18<br>414/749.1 |
| 2024/0336464 | A1* | 10/2024 | Kaul | B66F 9/12 |

FOREIGN PATENT DOCUMENTS

| | | | |
|---|---|---|---|
| CN | 210140412 | U | 3/2020 |
| JP | 3288799 | B2 | 6/2002 |
| WO | 2020160547 | A1 | 8/2020 |

OTHER PUBLICATIONS

Vestil Manufacturing Corp, SBP For Snow Plow, Aug. 15, 2014, https://www.youtube.com/watch?v=Zow60PGp7XI (Year: 2019).*

Vestil Manufacturing Corp., RPB-2 Vestil Hookbase Push Bumper, RPB-2 Manual, Rev. Oct. 14, 2020, pp. 1-5, https://www.vestil.com/product.php?FID=1678, US.

BFS Forks and Attachments, BFS Forklift Pusher, https://www.bfsltd.co.uk/products_awkward.asp, webpage, UK.

Koke Inc., Fork Mounted Trailer Mover, https://www.kokeinc.com/products/trailer-mover, webpage, US.

* cited by examiner

PALLET PUSHING DEVICE FOR FORKLIFT

CROSS-REFERENCE TO RELATED APPLICATIONS

This application claims the benefit of U.S. Provisional Application No. 63/317,119, filed on Mar. 7, 2022. The entire disclosure of the above application is incorporated herein by reference.

FIELD

The present technology includes a device and method that relate to a tool for a forklift, including a forklift mounted pushing device for pushing an object with the forklift.

INTRODUCTION

This section provides background information related to the present disclosure which is not necessarily prior art.

To move a palletized load from a forklift to a carrier where it can be transported, the load must be moved from an edge of the carrier where it is first placed to a forward location where it can be safely transported. Currently, to position a load, two timbers, such as 4×4×8 timbers, or straight bars can be positioned just above each fork of a forklift between the forklift and the load. Pressure can then be applied to the load using the forklift to move the load to the desired position. However, the timbers or straight bars must be manually placed and positioned as the load is pushed to its proper location. In addition, a view of a forklift operator can be obstructed by the forklift mast, making it difficult for the forklift operator to see what is occurring as the load is pushed into place.

Several issues exist with moving a palletized load using such timbers or straight bars. For example, the weight of a palletized load can range from 110 lbs. to 5,000 lbs. A great amount of pressure must be applied to the load to move it along the carrier, which can be as long as 20 feet. This creates an unsafe situation, as the timbers or straight bars are placed by workers and then moved by a forklift operator who may not have a clear view of the position of the workers and the load because the timbers or straight bars can move during positioning. In addition, the load and the carrier into which the load is placed can be damaged as the load is pushed.

Accordingly, there is a continuing need for a device that can safely enable a single user to place and move a heavy object to a proper position on a carrier so that the object can be transported.

SUMMARY

In concordance with the instant disclosure, a device that can safely enable a single user to place and move a heavy object to a proper position on a carrier so that the object can be transported has surprisingly been discovered.

In an embodiment, a pushing device to be mounted on forklift for pushing an object onto a carrier is provided. The pushing device can include a pair of push rails, a push bar, and a skid plate. Each of the pair of push rails can have an aperture for removably accepting a fork of the forklift. The push bar can be disposed on an opposite side of the pushing device from the apertures and can be used to contact and push the object. The skid plate can be disposed on a bottom side of the pushing device. The skid plate can provide an interface between the pushing device and the carrier as the object is pushed onto the carrier.

In another embodiment, a method of a pushing device to be mounted on a forklift to push an object onto a carrier. A pushing device, a forklift, and object can be provided. The pushing device can be mounted to the forklift. The pushing device can approach and contact the object. The forklift can be operated to push the object onto the carrier.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
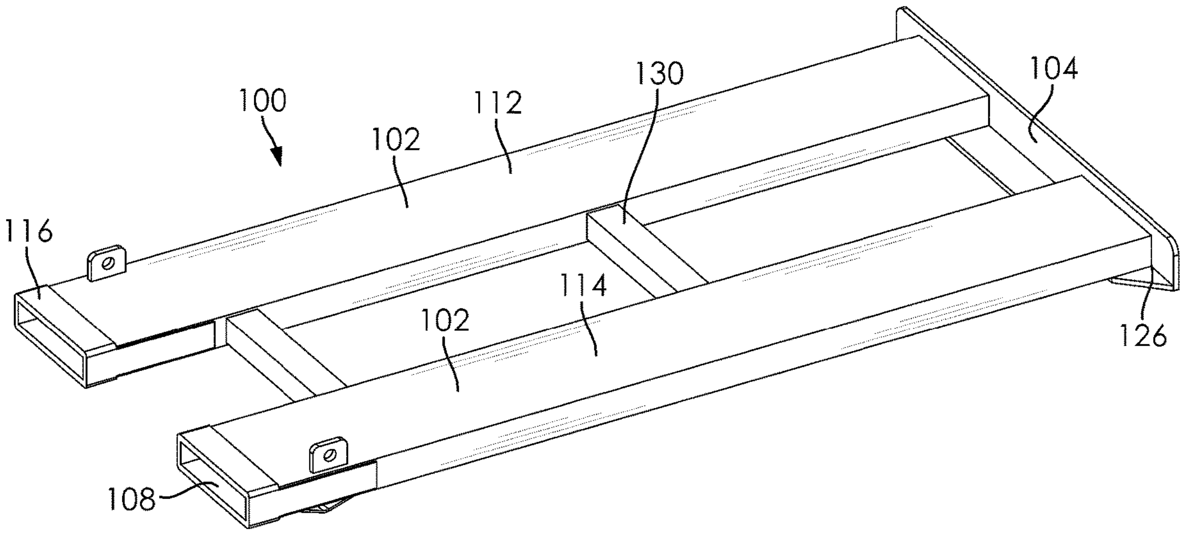
FIG. 1 is a top perspective view of a pushing device according to an embodiment of the present disclosure.

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of"

or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology relates to a pushing device that can be attached to a forklift to safely push a load onto a carrier for transportation. In certain embodiments, the pushing device can be used to push a load of up to 10,000 lbs. The present technology can be used to place a palletized load onto a pickup truck, a trailer, or other appropriate carrier where the load requires positioning. In particular, the present technology can be configured for pushing, not lifting, a palletized load into position on a carrier. The device can allow an experienced forklift operator to singularly complete the loading process by giving the operator greater control and line of sight during loading.

The pushing device can have a pair of push rails, a push bar for pushing to the load to its proper position, and a skid plate. In certain embodiments, the pushing device can include one or more central supports. Each of the pair of push rails can have an aperture at an end away from or opposite the push bar for receiving a fork of forklift. A bottom of the pushing device can include one or more skid plates and one or more bottom supports. When the device is connected to the forklift and begins to push, even pressure is applied to an area of the forklift carriage at or near the location of the vertical rails. This point of contact can optimize operation of the forklift in conjunction with the pushing device.

In certain embodiments, a pushing device can include a push rail having one or more apertures for removably accepting one or both forks of the forklift and a push bar on an opposite side of the one or more apertures. The push bar can be configured for pushing the object, where the push bar can be disposed parallel to an edge of the object and disposed perpendicular to the pair of push rails. One or more skid plates on a bottom side of the body can provide an interface between the body of the pushing device and a carrier as the object is pushed onto the carrier. The pushing device can be fabricated from steel and/or a metal alloy. As would be apparent to someone of ordinary skill in the art, the pushing device can be fabricated from any appropriately desired material and/or combinations of materials.

The pushing device provided by the present technology can comprise different widths and lengths for fitting differently sized forklifts and pushing loads onto differently sized trailers and carriers. For example, in certain embodiments, the push rail can be about 90 inches in length and the push bar can be about 40 inches in width. Alternatively, in certain embodiments, the push rail can be about 64 inches in length. In particular, the push rail and the push bar can be any appropriately desired size for pushing an object. In certain embodiments, the one or more apertures can be about 28 inches apart from a centerline. In addition, the pushing device can have different numbers of rails such as two side push rails or one middle rail. In certain embodiments, the skid plates can be ¾ inches in height from a surface that the pushing device is resting upon. However, it should be appreciated that the pushing device can be appropriately sized as desired for fitting a forklift and pushing an object. In certain embodiments, the pushing device can vary in length, width, and height to fit varying forklift and/or carrier geometries. In certain embodiments, the pushing device can also be configured for pulling using one or more connections, such as a sling around a load or other appropriately desired connection and/or attachment.

Advantageously, the present technology can save work hours as the pushing device allows one person to safely complete transferring a load from the forklift onto a trailer or other carrier. In addition, the present technology prevents damage to products and pallets, which can be damaged if they are pushed by forklift forks. Moreover, the present technology can prevent damage to tailgates, transmissions, and trailers during the loading process as the carrier surface is contacted by the one or more skid plates, which also hold the pushing device in place to push the load to its proper position on the carrier. As such, the present technology has many advantages.

EXAMPLES

Example embodiments of the present technology are provided with reference to the several figures enclosed herewith. The present technology relates to a pushing device 100 that can be mounted on a fork 101 of a forklift 103 to safely push an object 105 onto a carrier 107 for transportation, shown generally in FIGS. 1-6. The present disclosure further contemplates a method 200 of using a pushing device 100 that can be mounted on a forklift 103 to push an object 105, shown in FIG. 7.

Figure 2:
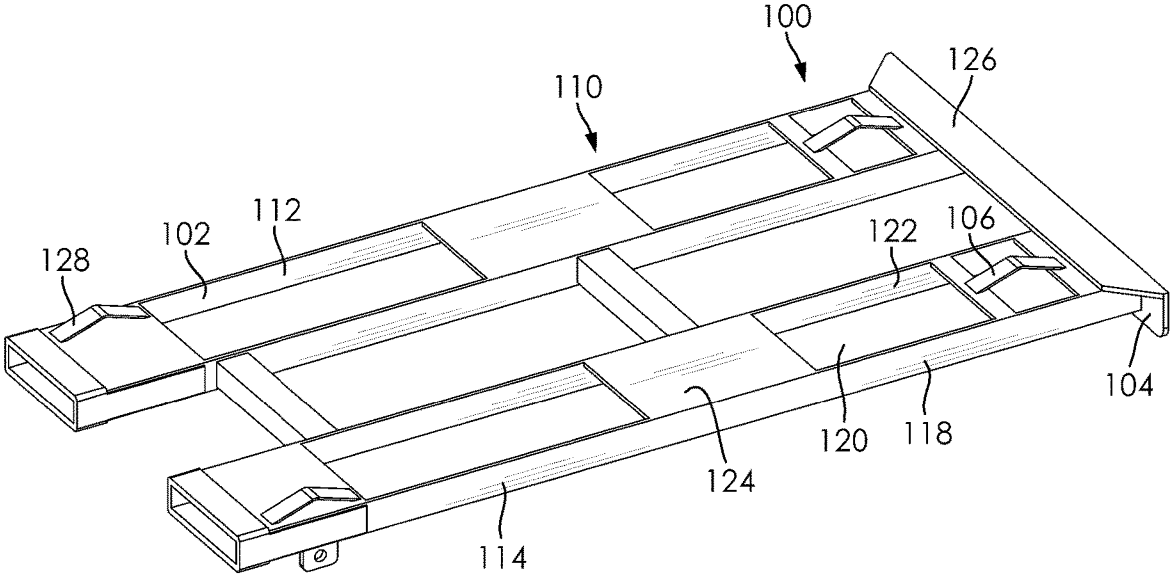
FIG. 2 is a bottom perspective vice thereof.

As shown in FIGS. 1-2, the pushing device 100 can include a pair of push rails 102, a push bar 104, and a skid plate 106. Each of the push rails 102 can include an aperture 108 for removably accepting a fork 101 of the forklift 103. The push bar 104 can be on an opposite side of the pushing device 100 from the apertures 108. The push bar 104 can be configured for pushing the object 105. The skid plate 106 can be disposed on a bottom side 110 of the pushing device 100. The skid plate 106 can provide an interface between the pushing device 100 and the carrier 107 as the object 105 is pushed onto the carrier 107.

Figure 3:
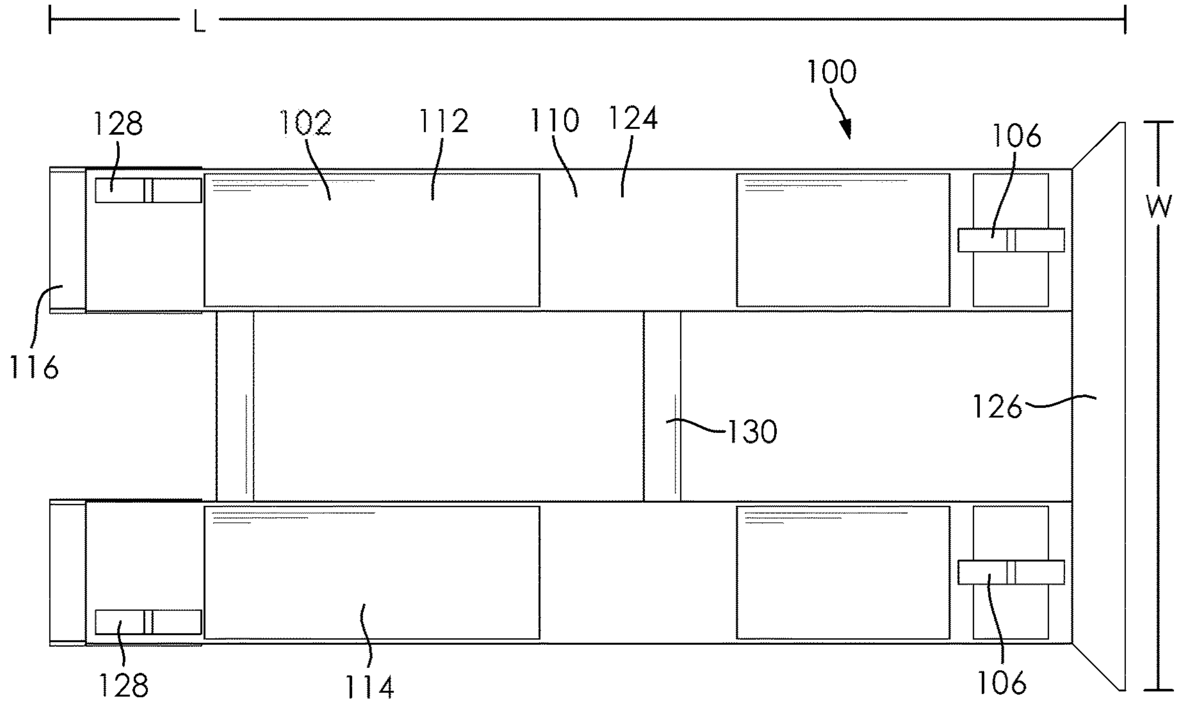
FIG. 3 is a bottom plan view thereof.

With reference to FIGS. 1-3, and as an example, the pair of push rails 102 can include a first push rail 112 and a second push rail 114. The first push rail 112 can be configured to accept a first fork of the forklift 103 and the second push rail can be configured to accept a second fork of the forklift 103. As such, the first push rail 112 and the second push rail 114 can be shaped substantially similar to the forks 101 of the forklift 103. A skilled artisan can select a shape for the pair of push rails 102 to allow for the pair of push rails 102 to accept the forks 101 of the forklift 103. The first push rail 112 and the second push rail 114 can be substantially parallel. In certain examples, the pushing device 100 can have a different number of push rails 102, such as two side push rails or a middle push rail (not shown). Advantageously, the number of push rails 102 can correspond to the number of forks 101 on the forklift 103 being used to push the object 105. One of ordinary skill in the art can select a suitable number of push rails 102 within the scope of the present disclosure.

Each of the first push rail 112 and the second push rail 114 can include an end cap 116 disposed on the same end of the push rail 102 as the aperture 108. Advantageously, the end cap 116 can protect the aperture 108 from denting or become misshapen during use. As a non-limiting example, the end cap 116 can be co-formed around the aperture 108. Alternatively, the end cap 116 can be selectively removable from the aperture 108 to allow for the end cap 116 to be easily replaced if damaged. One of ordinary skill in the art can select a suitable arrangement for the end cap 116 within the scope of the present disclosure.

Each of the first push rail 112 and the second push rail 114 can include a first sidewall 118, a top sidewall 120, and a second sidewall 122. The first sidewall 118, the top sidewall 120, and the second sidewall 122 can form a hollow interior for each of the first push rail 112 and the second push rail 114. The hollow interior can allow for the fork 101 of the forklift 103 to enter the pushing device 100 and be used by the forklift 103 as a pushing tool. An underside of the each of the pair of push rails 102 can be open and include a bottom support 124 that connects a portion of the first sidewall 118 and the second sidewall 122. Desirably, the bottom support 124 can provide each of the pair of push rails 102 with structural support and militate against the push rails 102 from flexing or becoming misshapen.

Figure 5:
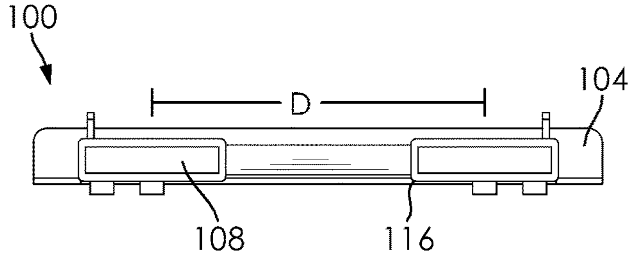
FIG. 5 is a front elevational view thereof.
Figure 6A:
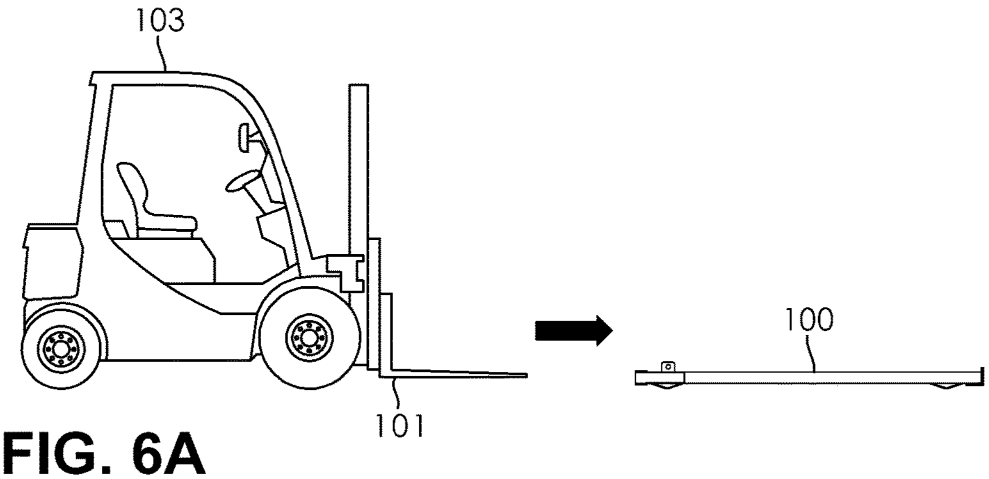
FIGS. 6A-6C are stepwise diagrams depicting the pushing device in use with a forklift to push an object onto a carrier.
Figure 6B:
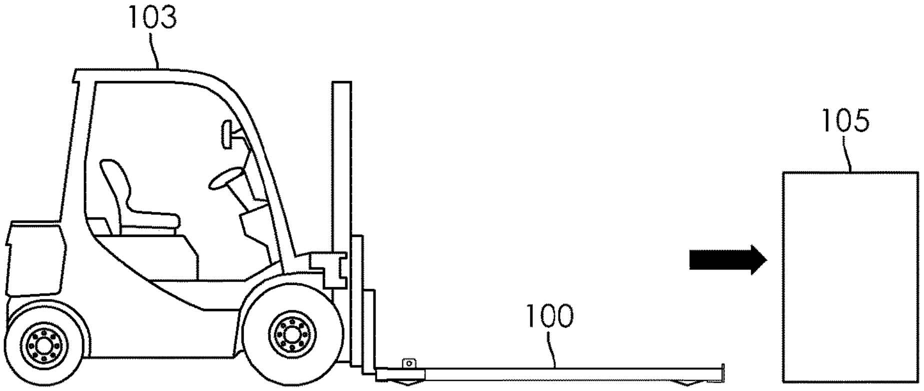
Figure 6C:
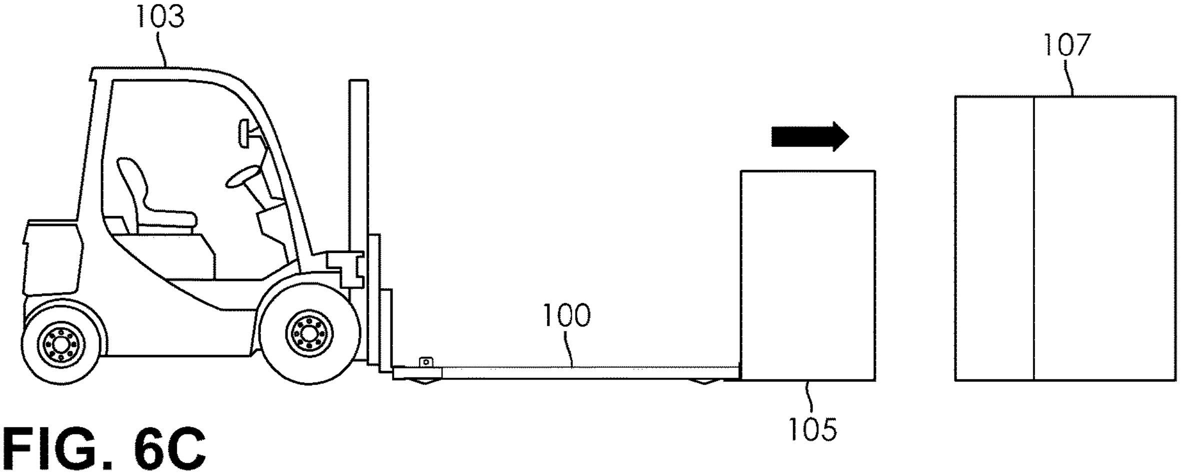

With particular reference to FIG. 5, there can be a predetermined distance (D) between centerlines of the first push rail 112 and the second push rail 114. Desirably, the predetermined distance (D) can correspond with the distance between the forks 101 of the forklift 103 to provide a secure fit between the pair of push rails 102 and the pushing device 100. As a non-limiting example, the predetermined distance (D) can be between about 8 inches and about 60 inches. More specifically, the predetermined distance (D) can be between about 18 inches and 44 inches. Most particularly, the predetermined distance (D) can be about 28 inches. One of ordinary skill in the art can select a suitable predetermined distance (D) within the scope of the present disclosure.

Figure 4:
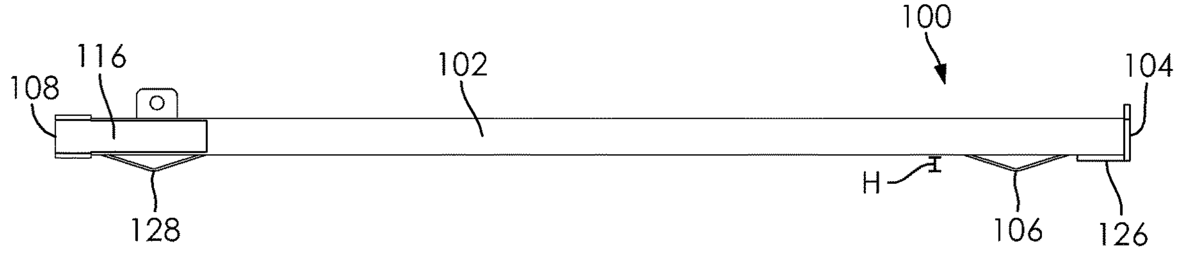
FIG. 4 is a right-side elevational view thereof.

As shown in FIGS. 1 and 4, the push bar 104 can be substantially planar to provide a flat surface for pushing. The push bar 104 can include a protrusion 126. The protrusion 126 can be on the bottom side of the push bar 104 of the pushing device 100 and can, as an example, be disposed perpendicular to the push bar 104. In one example, the protrusion 126 can be co-formed with the push bar 104. Further, the protrusion can be co-formed with the pair of push rails 102.

As described hereinabove, the skid plate 106 can provide an interface between the pushing device 100 and the carrier 107 as the object 105 is pushed onto the carrier 107. The skid plate 106 can have a predetermined height (H), as shown in FIG. 4, adapted to lift the pushing device 100 from a surface and assist the pushing device 100 with moving the object 105. The skid plate 106 can have a predetermined angle adapted to lift the pushing device 100 from a surface and assist the pushing device 100 with moving the object 105 onto the carrier 107. Advantageously, the predetermined angle can allow for the pushing device 100 to move easily along the surface and provide additional movability should the object 105 need to be pushed in multiple directions on the path to the carrier 107. Further, the predetermined angle can be intended to go over uneven surfaces, bumps, gaps, or cracks in both the forward and reverse direction. As a non-limiting example, the predetermined height (H) of the skid plate 106 can be between about 0.25 inches and about 1.5 inches. More particularly, the predetermined height (H) can be between about 0.5 inches and about 1 inch. In a most specific example, the predetermined height (H) can be about ¾ inches. One of ordinary skill in the art can select a suitable predetermined height (H) of the curvature for the skid plate 106 within the scope of the present disclosure.

With particular reference to FIG. 3, the end cap 116 can include a secondary skid plate 128 disposed on a bottom side 110 of the pushing device 100. The secondary skid plate 128 can provide a secondary interface between the pushing device 100 and the carrier 107 as the object 105 is pushed onto the carrier 107. The secondary skid plate 128 can assist with creating a more balanced pushing device 100 and therefore, allow for equal distribution of a weight thereof and, in turn, a force required to push the object 105. As an example, both the predetermined height (H) and the predetermined angle of the secondary skid plate 128 can be the same as the predetermined height (H) and the predetermined angle of the skid plate 106. One of skill in the art can select a suitable predetermined height (H) and predetermined angle for the secondary skid plate 128.

As shown in FIGS. 1 and 3, the pushing device 100 can include a central support 130 disposed between the pair of push rails 102. The central support 130 can offer structural integrity to the pushing device 100 and act as a support beam between the first push rail 112 and the second push rail 114. The central support 130 can militate against the first push rail 112 and the second push rail 114 from flexing, becoming misshapen, and out of a substantially parallel position. Advantageously, the central support 130 can maintain the structure and allow for the first push rail 112 to easily accept the first fork and second push rail 114 to easily accept the second fork. Additionally, the pushing device 100 can include multiple central supports 130 disposed between the pair of push rails 102.

As shown in FIG. 3, the pushing device 100 can have a predetermined length (L) to accommodate the length of the forks 101 of the forklift 103. The length of the pushing device 100 can be varied to allow for the pushing device 100 to be adapted to any forklift 103. As a non-limiting example, the predetermined length (L) can be about 64 inches. As another non-limiting example, the predetermined length (L) can be about 90 inches. The pushing device 100 can also have a predetermined width (W) to accommodate the width of the object 105 being pushed. The width (W) of the pushing device 100 can be varied to allow for the pushing device 100 to be adapted to push a variety of objects. As a non-limiting example, the predetermined width (W) can be about 40 inches. One of ordinary skill in the art can select a suitable predetermined length (L) and a suitable predetermined width (W) within the scope of the present disclosure.

Figure 7:
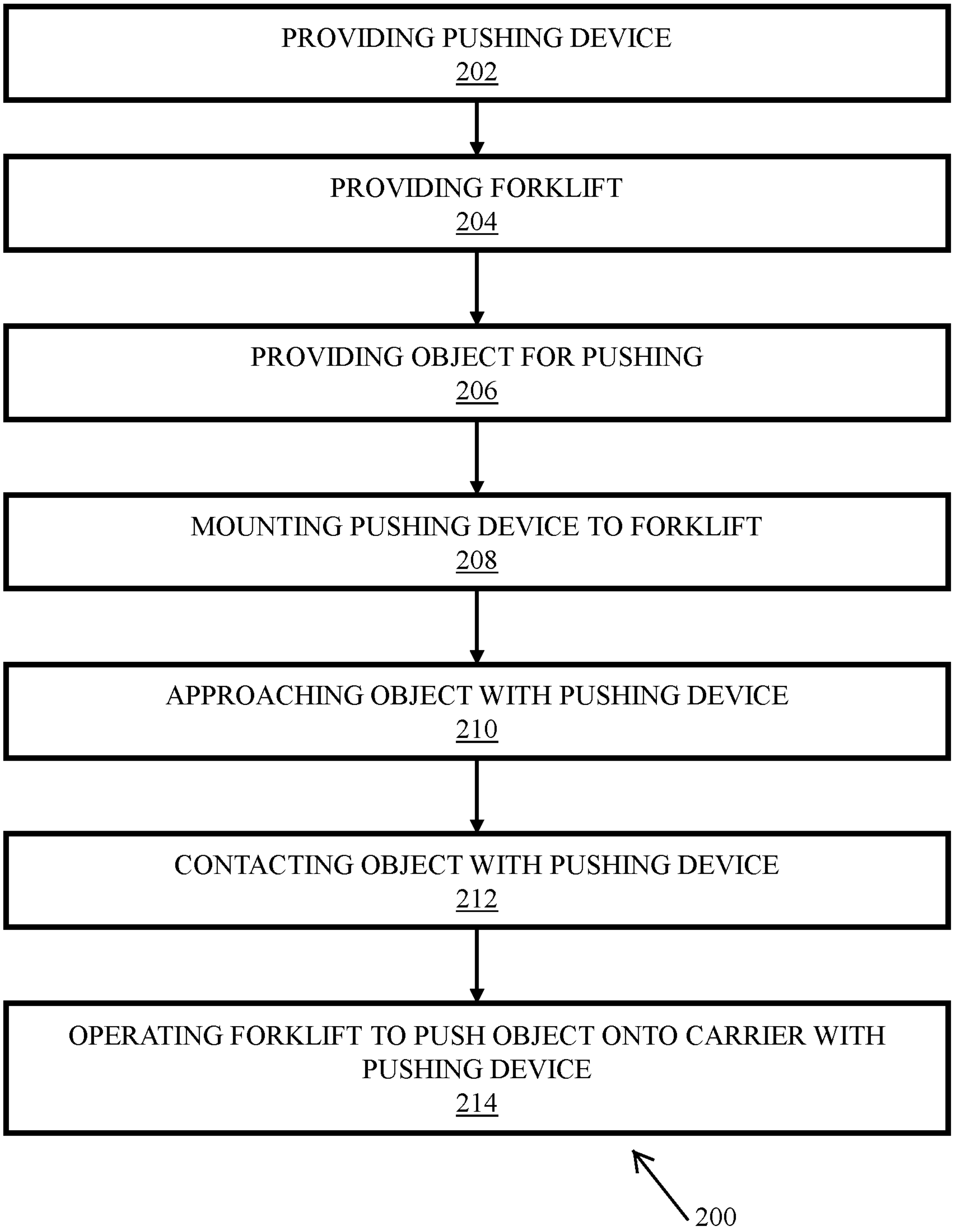
FIG. 7 is a flow diagram depicting a method of a pushing device to be mounted on a forklift to push an object into a carrier.

As depicted in FIG. 7, the present disclosure further provides a method 200 of using a pushing device 100 to be mounted on a forklift to push an object 105 onto a carrier. In a step 202, the pushing device 100 having a pair of push rails 102, a push bar 104, and a skid plate 106, described hereinabove, can be provided. A forklift 103 can be provided in a step 204. An object 105 for pushing can be provided in a step 206. In a step 208, the pushing device 100 can be mounted to the forklift 103 by inserting the first fork of the forklift 103 into the aperture 108 of the first push rail 112 and the second fork of the forklift 103 into the aperture 108 of the second push rail 114. The forklift 103 can approach the object 105 with the pushing device 100 in a step 210. In a step 212, the pushing device 100 can make contact with the object 105. The forklift 103 can be operated to push the object 105 onto a carrier in a step 214.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A pushing device to be mounted on a fork of a forklift for pushing an object onto a carrier, comprising:
- a pair of push rails, each of the push rails having an aperture for removably accepting the fork of the forklift, and each of the push rails includes an end cap co-formed around the aperture;
- a push bar disposed on and spanning across the pair of push rails on an opposite side of the pushing device from the apertures, wherein the push bar includes a single planar surface configured for pushing the object; and
- a skid plate on a bottom side of the pushing device, wherein the skid plate provides an interface between the pushing device and the carrier as the object is pushed onto the carrier using the pushing device.

2. The pushing device of claim 1, further including a central support disposed between the pair of push rails.

3. The pushing device of claim 1, wherein the end cap includes a secondary skid plate.

4. The pushing device of claim 1, wherein the pair of push rails includes a first push rail and a second push rail, the first push rail configured to accept a first fork of the forklift and the second push rail configured to accept a second fork of the forklift.

5. The pushing device of claim 4, wherein there is a predetermined distance between a center of the first push rail and a center of the second push rail, the predetermined distance is 28 inches.

6. The pushing device of claim 1, wherein each of the push rails includes a hollow interior.

7. The pushing device of claim 1, wherein each of the push rails includes a first sidewall, a top sidewall, and a second sidewall.

8. The pushing device of claim 7, wherein each of the push rails includes a bottom support connecting a portion of the first sidewall and the second sidewall.

9. The pushing device of claim 1, wherein a bottom side of the push bar includes a protrusion, the protrusion being perpendicular and co-formed with the push bar.

10. The pushing device of claim 9, wherein the protrusion is co-formed with the pair of push rails.

11. The pushing device of claim 1, wherein the skid plate has a predetermined height configured to lift the pushing device from a surface and assist the pushing device with moving the object.

12. The pushing device of claim 11, wherein the predetermined height of the skid plate is ¾ inches.

13. The pushing device of claim 1, wherein the skid plate has a predetermined angle adapted to lift the pushing device from a surface and assist the pushing device with moving the object.

14. The pushing device of claim 1, wherein the pushing device has a predetermined length to accommodate a length of the fork of the forklift.

15. The pushing device of claim 14, wherein the predetermined length of the pushing device is 90 inches.

16. The pushing device of claim 14, wherein the predetermined length of the pushing device is 64 inches.

17. The pushing device of claim 1, wherein the pushing device has a predetermined width to accommodate a width of the object.

18. The pushing device of claim 17, wherein the predetermined width of the pushing device is 40 inches.

19. A method of using a pushing device to be mounted on a fork of a forklift for pushing an object onto a carrier, comprising:

providing a pushing device including:

a pair of push rails, each of the push rails having an aperture for removably accepting a fork of the forklift, and each of the push rails includes an end cap co-formed around the aperture, a push bar disposed on and spanning across the pair of push rails on an opposite side of the pushing device from the apertures, wherein the push bar includes a single planar surface configured for pushing the object, and a skid plate on a bottom side of the pushing device, wherein the skid plate provides an interface between the pushing device and the carrier as the object is pushed onto the carrier;

providing the forklift;

providing the object for pushing;

mounting the pushing device to the fork of the forklift;

approaching the object with the pushing device;

contacting the object with the pushing device; and operating the forklift to push the object onto a carrier with the pushing device.

* * * * *